(12) United States Patent
Chou et al.

(10) Patent No.: US 12,543,250 B2
(45) Date of Patent: Feb. 3, 2026

(54) LED DRIVER, LED LIGHTING SYSTEM AND OPERATING METHOD THEREOF

(71) Applicant: Delta Electronics, Inc., Taoyuan (TW)

(72) Inventors: Ching-Ho Chou, Taoyuan (TW); Yung-Chuan Lu, Taoyuan (TW); Tsung-Ta Wu, Taoyuan (TW); Chien-Ting Lin, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 93 days.

(21) Appl. No.: 18/740,782

(22) Filed: Jun. 12, 2024

(65) Prior Publication Data

US 2025/0098048 A1 Mar. 20, 2025

Related U.S. Application Data

(60) Provisional application No. 63/538,621, filed on Sep. 15, 2023, provisional application No. 63/608,917, filed on Dec. 12, 2023.

(30) Foreign Application Priority Data

Mar. 27, 2024 (CN) .......................... 202410361110.4

(51) Int. Cl.
*H05B 45/325* (2020.01)
*H05B 45/10* (2020.01)
(52) U.S. Cl.
CPC ........... *H05B 45/325* (2020.01); *H05B 45/10* (2020.01)

(58) Field of Classification Search
CPC ... H05B 45/325; H05B 45/10; H05B 45/3725
See application file for complete search history.

(56) References Cited

U.S. PATENT DOCUMENTS

| | | |
|---|---|---|
| 10,159,816 B2 | 12/2018 | Tsai et al. |
| 10,265,497 B2 | 4/2019 | Tsai et al. |
| 10,960,225 B2 | 3/2021 | Adaikkan et al. |

(Continued)

FOREIGN PATENT DOCUMENTS

| | | |
|---|---|---|
| CA | 3196387 A1 | 5/2022 |
| CN | 101810052 A | 8/2010 |

(Continued)

*Primary Examiner* — Renan Luque
(74) *Attorney, Agent, or Firm* — KIRTON McCONKIE; Evan R. Witt

(57) ABSTRACT

An LED driver, an LED lighting system and an operating method thereof are provided. The LED driver is for driving an LED light source and includes a strobe circuit and a DC-DC converter. The strobe circuit generates a low-frequency modulation signal. The DC-DC converter is coupled to the strobe circuit and is configured to provide an adjustable operating current to the LED light source according to a DC signal and the low-frequency modulation signal. The operating current includes a DC current signal and a low-frequency AC current signal corresponding to the DC signal and the low-frequency modulation signal respectively. A frequency of the low-frequency AC current signal is between 25 Hz and 100 Hz, and a current ripple factor, equaling a difference of a maximum value and a minimum value of the operating current divided by a sum of the maximum value and the minimum value, is less than 8%.

20 Claims, 12 Drawing Sheets

(56) References Cited

U.S. PATENT DOCUMENTS

| | | |
|---|---|---|
| 11,241,586 B2 | 2/2022 | Tsai et al. |
| 2013/0119886 A1 | 5/2013 | Hurst |
| 2018/0279429 A1 | 9/2018 | Sadwick |
| 2019/0159308 A1* | 5/2019 | Eum ................ H05B 45/10 |
| 2021/0160985 A1 | 5/2021 | Eggermont |
| 2022/0117056 A1* | 4/2022 | Sohma ............. H05B 45/325 |
| 2024/0015868 A1 | 1/2024 | Hsia |

FOREIGN PATENT DOCUMENTS

| | | | |
|---|---|---|---|
| CN | 207253579 U | 4/2018 | |
| CN | 213522466 U | 6/2021 | |
| CN | 113348730 A | 9/2021 | |
| CN | 114375081 A | 4/2022 | |
| CN | 115089197 A | 9/2022 | |
| CN | 116951341 A | 10/2023 | |
| JP | 4223760 B2 | 2/2009 | |
| JP | 7219998 B1 | 2/2023 | |
| TW | 201244527 A | 11/2012 | |
| TW | I814339 B | 9/2023 | |
| WO | WO-2010128845 A2 * | 11/2010 | ............ H05B 45/32 |
| WO | 2022027030 A1 | 2/2022 | |

\* cited by examiner

LED DRIVER, LED LIGHTING SYSTEM AND OPERATING METHOD THEREOF

CROSS-REFERENCE TO RELATED APPLICATION

This application claims the benefits of U.S. Provisional Application No. 63/538,621 filed on Sep. 15, 2023 and entitled "LED DRIVER", and U.S. Provisional Application No. 63/608,917 filed on Dec. 12, 2023 and entitled "LED DRIVER". This application also claims priority to China Patent Application No. 202410361110.4 filed on Mar. 27, 2024. The entire contents of the above-mentioned patent applications are incorporated herein by reference for all purposes.

FIELD OF THE INVENTION

The present disclosure relates to an LED (light-emitting diode) driver and an LED lighting system, and more particularly to the LED driver and the LED lighting system which may perform Gamma strobes.

BACKGROUND OF THE INVENTION

Medical researches on the prevention or therapy of Alzheimer's Disease have proposed that exposure to lights flickering at a frequency within the Gamma band (hereinafter referred to as "Gamma strobe") can improve or delay symptoms in patients. The Gamma band refers to a frequency band between 25 Hz and 100 Hz. Currently, the use of phototherapy with lights flickering at 40 Hz is a primary focus of research and application. During the phototherapy process, patients would perceive obvious flickering lights.

FIG. 1 is a schematic view illustrating a conventional LED driver. As shown in FIG. 1, the LED driver receives electric energy from the utility power and accordingly provides power to an LED light source. The utility power varies in specifications across different countries, such as 110/220 V, 60 Hz AC power in Taiwan, 100/200/242 V, 50/60 Hz AC power in Japan, 220/230/240 V, 50 Hz AC power in Europe, and 120/277 V, 60 Hz AC power in the United States.

FIG. 2 schematically shows an output current Iout of the LED driver of FIG. 1. In general lighting applications, the LED driver provides DC power to the LED light source, and the brightness of the LED light source is proportional to a magnitude of the current flowing through the LED light source. Accordingly, the LED driver may adjust the brightness of the LED light source through controlling the magnitude of the current flowing through the LED light source, thereby achieving dimming function.

Due to the fact that human eyes are more sensitive to the lights flickering at frequencies below 60 Hz, when exposed to Gamma strobes, some patients may feel uncomfortable and be unable to tolerate sufficient exposure time, resulting in poor therapeutic effect.

SUMMARY OF THE INVENTION

The present disclosure provides an LED driver, an LED lighting system and an operating method thereof in order to overcome the drawbacks of conventional technologies and to reduce the discomfort of users.

In accordance with an aspect of the present disclosure, an LED driver is provided. The LED driver is for driving an LED light source and includes a strobe circuit and a DC-DC converter. The strobe circuit is configured to generate a low-frequency modulation signal. The DC-DC converter is coupled to the strobe circuit and is configured to provide an adjustable operating current to the LED light source according to a DC signal and the low-frequency modulation signal. The operating current includes a DC current signal and a low-frequency AC current signal corresponding to the DC signal and the low-frequency modulation signal respectively. A frequency of the low-frequency AC current signal is between 25 Hz and 100 Hz, and a current ripple factor, equaling a difference of a maximum value and a minimum value of the operating current divided by a sum of the maximum value and the minimum value, is less than 8%.

In accordance with another aspect of the present disclosure, an LED lighting system is provided. The LED lighting system includes an LED light source and an LED driver. The LED driver drives an LED light source and includes a strobe circuit and a DC-DC converter. The strobe circuit is configured to generate a low-frequency modulation signal. The DC-DC converter is coupled to the strobe circuit and the LED light source and is configured to provide an adjustable operating current to the LED light source according to a DC signal and the low-frequency modulation signal. The operating current includes a DC current signal and a low-frequency AC current signal corresponding to the DC signal and the low-frequency modulation signal respectively. A frequency of the low-frequency AC current signal is between 25 Hz and 100 Hz, and a current ripple factor, equaling a difference of a maximum value and a minimum value of the operating current divided by a sum of the maximum value and the minimum value, is less than 8%.

In accordance with further another aspect of the present disclosure, an operating method of an LED driver for driving an LED light source is provided. The operating method includes generating a low-frequency modulation signal with a strobe circuit of the LED driver and providing an adjustable operating current to the LED light source according to a DC signal and the low-frequency modulation signal with a DC-DC converter of the LED driver coupled to the strobe circuit. The operating current includes a DC current signal and a low-frequency AC current signal corresponding to the DC signal and the low-frequency modulation signal respectively. A frequency of the low-frequency AC current signal is between 25 Hz and 100 Hz; and a current ripple factor, equaling a difference of a maximum value and a minimum value of the operating current divided by a sum of the maximum value and the minimum value, is less than 8%.

In the present disclosure, a percent flicker of the LED light source is limited to avoid users to perceive flickering lights. Accordingly, using Gamma strobes for phototherapy is less likely to cause discomfort to patients, thereby allowing the exposure time to be sufficient enough to achieve better therapeutic effect.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only.

Figure 1:
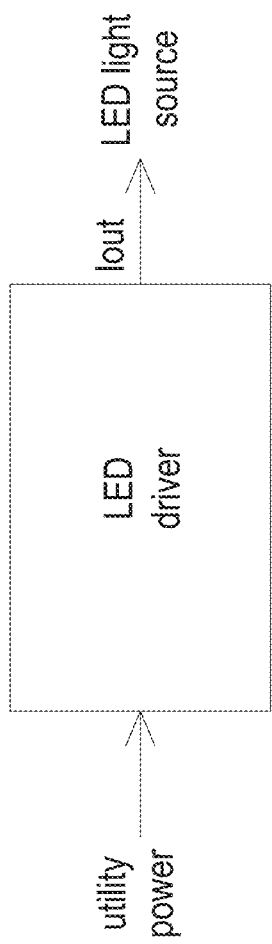
FIG. 1 is a schematic view illustrating a conventional LED driver.
Figure 2:
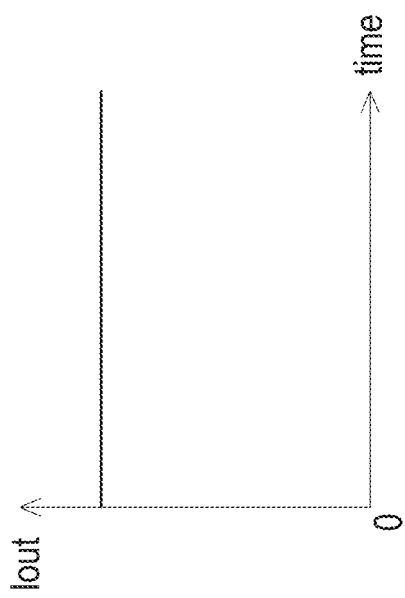
FIG. 2 schematically shows an output current of the LED driver of FIG. 1.
Figure 3:
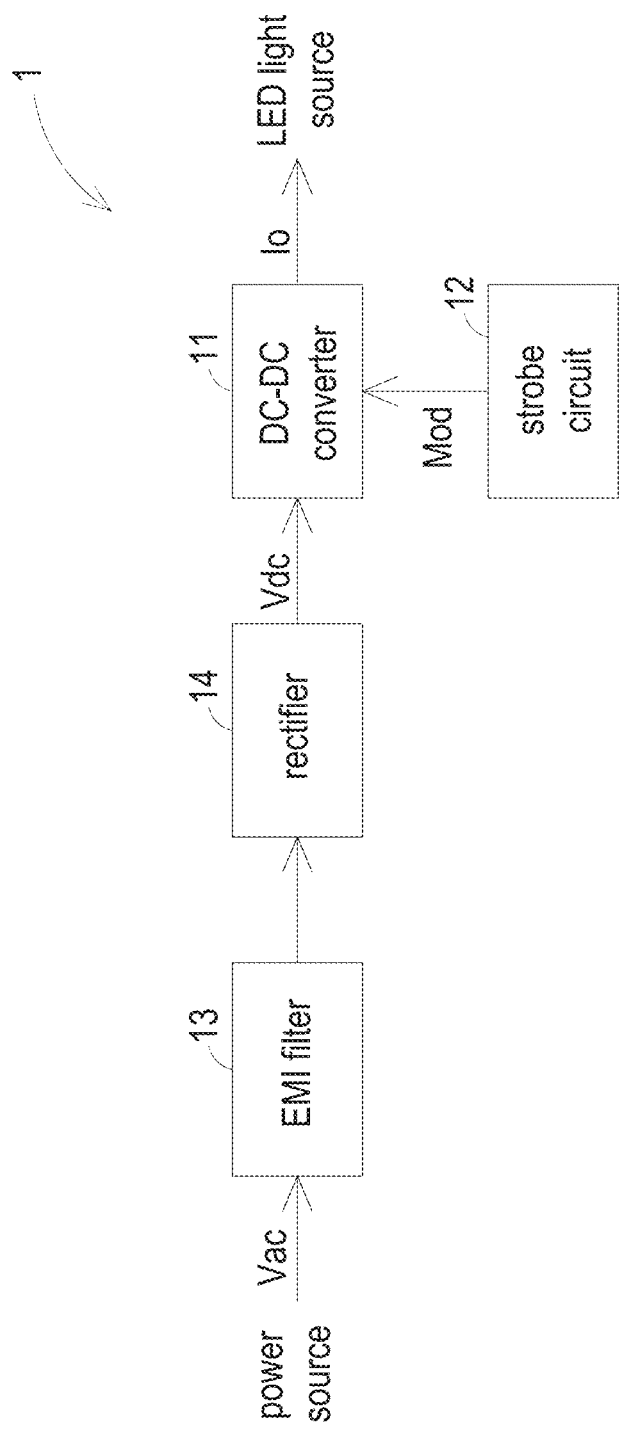
FIG. 3 is a schematic block diagram illustrating an LED driver according to a first embodiment of the present disclosure.

FIG. 3 is a schematic block diagram illustrating an LED driver according to a first embodiment of the present disclosure. As shown in FIG. 3, the LED driver 1 receives an AC input signal Vac from a power source and correspondingly generates an operating current Io to drive an LED light source. In the embodiment shown in FIG. 3, the LED driver 1 includes a DC-DC converter (DC-to-DC power converter) 11, a strobe circuit 12, an EMI (electromagnetic interference) filter 13, and a rectifier 14. For the sake of brevity, other components of the LED driver 1 are not depicted in the figure. The EMI filter 13 is coupled to the power source and is configured to reduce or eliminate electromagnetic interference of the AC input signal Vac. The rectifier 14 is coupled to the EMI filter 13. The rectifier 14 is configured to rectify the AC input signal Vac filtered by the EMI filter 13 into a DC signal Vdc and to provide the DC signal Vdc to the DC-DC converter 11. The rectifier 14 may adopt a bridge rectifier or other suitable rectifier circuits.

The DC-DC converter 11 may adopt a suitable power conversion circuit such as a buck converter, a boost converter, a buck-boost converter, or a flyback converter. The DC-DC converter 11 converts the DC signal Vdc into a DC voltage required by the LED light source and provides an adjustable operating current Io to the LED light source, and hence the DC-DC converter 11 is able to adjust the brightness of the LED light source. The strobe circuit 12 is coupled to the DC-DC converter 11 and is configured to generate a low-frequency modulation signal Mod. The strobe circuit 12 may adopt an astable multivibrator circuit or other suitable analog circuits and/or digital circuits to generate signals with suitable formats, e.g., sinusoidal signals, harmonic signals, and pulse signals, at the required frequency as the low-frequency modulation signal Mod.

According to the DC signal Vdc and the low-frequency modulation signal Mod, the DC-DC converter 11 generates the required operating current Io to make the brightness of the LED light source vary with a strobe frequency Fg. The strobe frequency Fg is configured to fall within the Gamma band between 25 Hz and 100 Hz. In an embodiment, the strobe frequency Fg is between 30 Hz and 50 Hz. In another embodiment, the strobe frequency Fg is 40 Hz. In an embodiment, the operating current Io, provided by the DC-DC converter 11 according to the DC signal Vdc and the low-frequency modulation signal Mod, includes a DC current signal Idc and a low-frequency AC current signal Ig, and the frequency of the low-frequency AC current signal Ig falls within the Gamma band between 25 Hz and 100 Hz. In an embodiment, the frequency of the low-frequency AC current signal Ig is between 30 Hz and 50 Hz. In another embodiment, the frequency of the low-frequency AC current signal Ig is 40 Hz. By configuring the current value of the operating current Io to vary between Idc and Idc+Ig (i.e., equal to either Idc or Idc+Ig) with the strobe frequency Fg, the DC-DC converter 11 allows the brightness of the LED light source to vary with the strobe frequency Fg correspondingly.

In addition, the components of the LED driver 1 may be added or removed according to different design considerations. For example, in FIG. 3, the LED driver 1 includes the EMI filter 13 and the rectifier 14. While in another embodiment, if the LED driver is coupled to a DC input power source, the LED driver may not include the EMI filter 13 and the rectifier 14.

Figure 4:
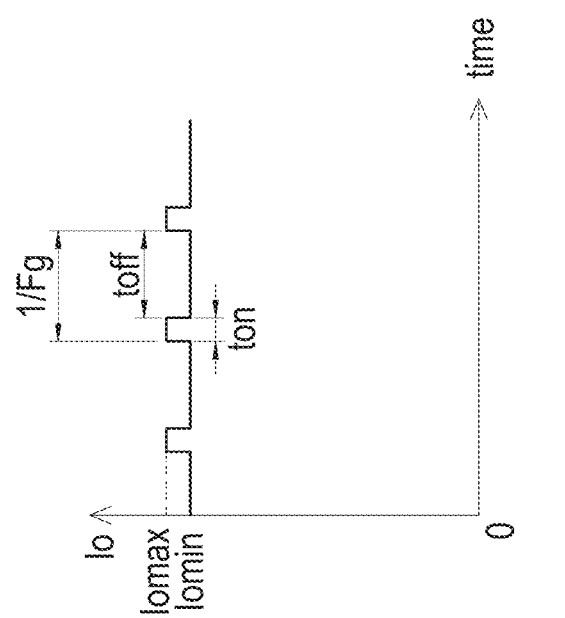
FIG. 4 schematically shows an operating current provided to the LED light source by the LED driver in FIG. 3.

FIG. 4 schematically shows the operating current Io provided to the LED light source by the LED driver 1 in FIG. 3. As shown in FIG. 4, the current level of the operating current Io varies with the strobe frequency Fg. In one period (1/Fg), "ton" represents the time of the operating current Io being at a higher level, "toff" represents the time of the operating current Io being at a lower level, and a duty cycle of the time of the operating current Io being at the higher level (hereinafter referred to as a strobe duty cycle) is equal to ton/(ton+toff). Since the frequency of level variations of the operating current Io is influenced by the low-frequency modulation signal Mod, in an embodiment, the duty cycle of the low-frequency modulation signal Mod generated by the strobe circuit 12 is configured to be ton/(ton+toff) for making the strobe duty cycle of the operating current Io generated by the DC-DC converter 11 be ton/(ton+toff) correspondingly. In an embodiment, the strobe duty cycle of the operating current Io generated by the DC-DC converter 11 is less than 50%. In an embodiment, the strobe duty cycle of the operating current Io generated by the DC-DC converter 11 is less than 30%. In another embodiment, the strobe duty cycle of the operating current Io generated by the DC-DC converter 11 is greater than 10% and less than 50%. In further another embodiment, the strobe duty cycle of the operating current Io generated by the DC-DC converter 11 is between 10% and 30%.

Figure 5:
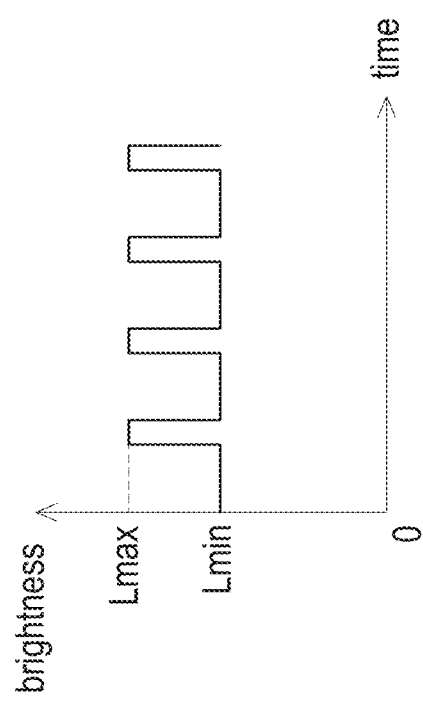
FIG. 5 schematically shows brightness waveforms of the LED light source driven by the LED driver of FIG. 3.

FIG. 5 schematically shows the brightness waveforms of the LED light source driven by the LED driver 1 of FIG. 3. A percent flicker of the LED light source may be calculated according to equation (1).

$$PF = (L\max - L\min)/(L\max + L\min) * 100\% \quad (1)$$

In equation (1), PF is the percent flicker, Lmax is a maximum brightness, and Lmin is a minimum brightness. Since the brightness of the LED light source has a positive correlation with the magnitude of the operating current Io, a current ripple factor CRF can be defined by a similar equation, as shown in equation (2).

$$CRF = (\text{Iomax} - \text{Iomin})/(\text{Iomax} + \text{Iomin}) * 100\% = \quad (2)$$

$$(Idc + Ig - Idc)/(Idc + Ig + Idc) * 100\% = Ig/(2 * Idc + Ig) * 100\%$$

In equation (2), Iomax is a maximum value of the operating current Io, and Iomin is a minimum value of the operating current Io. Further, the percent flicker PF of the LED light source can be estimated according to the current ripple factor CRF. For example, the percent flicker PF of the LED light source may be configured to equal the current ripple factor CRF, and thus the percent flicker PF of the LED light source may be controlled to be lower than a required value by configuring the current ripple factor CRF. In another embodiment, the percent flicker PF of the LED light source is configured to equal a function of the current ripple factor CRF (e.g., PF=f (CRF)=A*CRF+B, where A and B are appropriate values), and thus the percent flicker PF of the LED light source may be controlled to be lower than a required value by configuring the current ripple factor CRF.

Although the sensitivity to flickering lights varies among users, the percent flicker PF of the LED light source should be limited to a suitable value to avoid perceivable flickering lights. In an embodiment, the percent flicker PF of the LED light source is configured to be less than 10%. In another embodiment, if the flicker frequency is 40 Hz, according to one of the suggestions given by IEEE standard 1789, the percent flicker PF of the LED light source is configured to be less than 1% to avoid the human eyes from perceiving strobe. Under the circumstance that percent flicker PF of the LED light source is less than 1%, by configuring the percent flicker PF to equal the current ripple factor CRF, it can be derived from the above equation of the current ripple factor CRF that the maximum value of the operating current Io (Iomax=Idc+Ig) should be less than approximately 1.02 times the minimum value of the operating current Io (Iomin=Idc). Namely, the maximum current value of the low-frequency AC current signal Ig should be less than approximately 0.02 times the current value of the DC current signal Idc. In another embodiment, if the flicker frequency is 100 Hz, according to one of the suggestions given by IEEE standard 1789, the percent flicker PF of the LED light source is configured to be less than 8%, and the percent flicker PF of the LED light source is configured to equal the current ripple factor CRF. According to the above equation of the current ripple factor CRF, it is derived that the maximum value of the operating current Io (Iomax=Idc+Ig) should be less than approximately 1.174 times the minimum value of the operating current Io (Iomin=Idc), and namely the maximum current value of the low-frequency AC current signal Ig should be less than approximately 0.174 times the current value of the DC current signal Idc. Accordingly, the operating current Io generated by the LED driver 1 of the present disclosure varies between Iomax and Iomin with the strobe frequency Fg, and hence illumination lights generated by the LED light source, driven by the operating current Io, include not only the stable brightness caused by the DC current signal Idc but also brightness variations with the strobe frequency Fg caused by the low-frequency AC current signal Ig. Moreover, by configuring the operating current Io generated by the LED driver 1, the percent flicker PF of the LED light source is configured to be less than a certain value such that the brightness variations with the strobe frequency Fg would not be perceived by the human eyes and would not cause discomfort. Therefore, the duration of low-frequency phototherapy realized based on the LED driver 1 of the present disclosure does not need to be restricted as in conventional phototherapy treatments. Furthermore, the Gamma strobe realized in the present disclosure may be applied to daily lighting fixtures for providing round-the-clock phototherapy. In an embodiment, the maximum value of the operating current Io (Iomax=Idc+Ig) generated by the DC-DC converter 11 is configured to be less than approximately 1.105 times the minimum value of the operating current Io (Iomin=Idc), and the percent flicker PF of the LED light source is configured to equal the current ripple factor CRF so that the percent flicker PF of the LED light source would be less than 5%.

From the above-mentioned equations, in order to make the percent flicker PF of the LED light source below a required value, the maximum current value of the low-frequency AC current signal Ig should be configured to be less than a specific proportion of the current value of the DC current signal Idc. Therefore, even if magnitude variations of the current value of the DC current signal Idc causes brightness variations in the lights of the LED light source, the Gamma strobe effect provided by the low-frequency AC current signal Ig can always keep the percent flicker PF of the LED light source less than the required value without being perceived by users and causing discomfort. In an embodiment, the strobe circuit 12 includes a modulation-signal generation circuit 121 shown in FIG. 6. The modulation-signal generation circuit 121 is used to generate a low-frequency modulation signal Mod, and the DC-DC converter 11 configures the current value of the low-frequency AC current signal Ig to be less than a specific proportion of the current value of the DC current signal Idc according to the low-frequency modulation signal Mod. The modulation-signal generation circuit 121 includes a current sense terminal CS, a switch S1, and resistors R1 and R2. The resistor R1 and the switch S1 are coupled in series between the current sense terminal CS and the ground potential (or other suitable default potential). The resistor R2 is coupled between the current sense terminal CS and the ground potential and is coupled in parallel to the resistor R1 and the switch S1.

Figure 6:
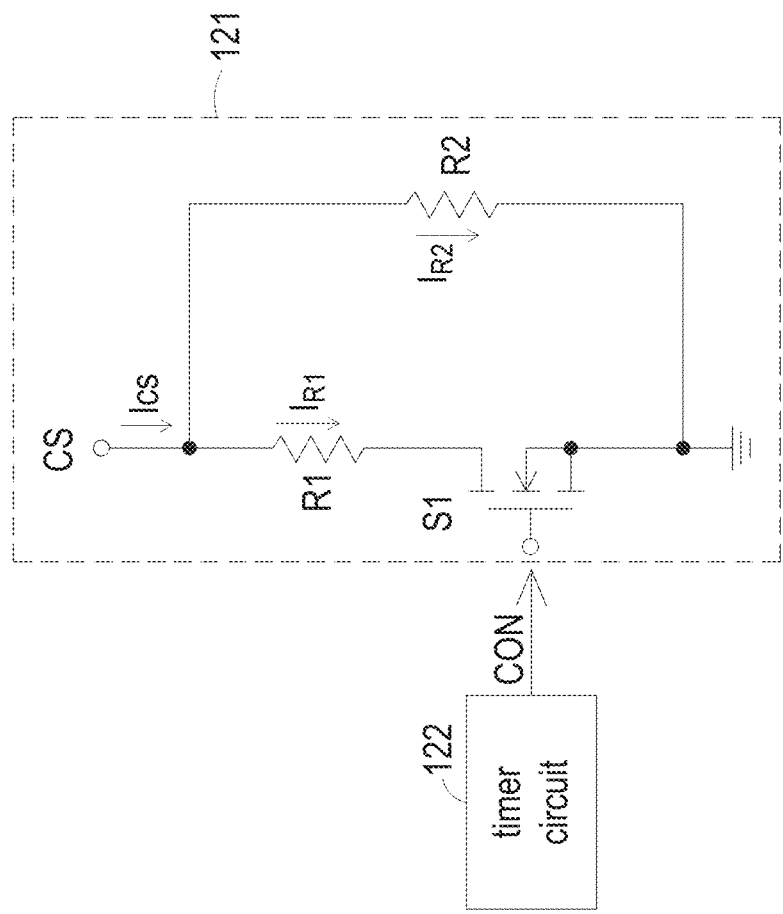
FIG. 6 schematically shows an implementation of the strobe circuit of the present disclosure.

In the embodiment shown in FIG. 6, the strobe circuit 12 includes a timer circuit 122. The timer circuit 122 may adopt suitable analog and/or digital circuits (such as circuit like LM555), and the timer circuit 122 is used to provide a switch control signal CON to a control terminal of the switch S1 for configuring the conduction state of the switch S1. The timer circuit 122 may be configured to generate the switch control signal CON including a pulse signal which is at a frequency in the Gamma band (e.g., 40 Hz) and has a duty cycle less than 50% (e.g., 10%), so as to generate the required low-frequency modulation signal Mod. In an embodiment, under the circumstance that a voltage value Vcs between the current sense terminal CS and the ground potential is fixed, when the timer circuit 122 configures the switch control signal CON to a high level for turning on the switch S1, a resistance value Rcs between the current sense terminal CS and the ground potential is equal to the resistance value of parallel resistors R1 and R2, and a current value Ics flowing through the current sense terminal CS is equal to Vcs/Rcs=Vcs/(R1/R2)=Vcs/((R1*R2)/(R1+R2)). Alternatively, when the timer circuit 122 configures the switch control signal CON to a low level for turning off the switch S1, the resistance value Rcs between the current sense terminal CS and the ground potential is equal to a resistance value of the resistor R2, and the current value Ics flowing through the current sense terminal CS is equal to Vcs/Rcs=Vcs/R2. For example, Vcs is 0.1 V, R1 is 10Ω, and R2 is 10Ω. When the switch S1 turns off, the current value Ics flowing through the current sense terminal CS is equal to Vcs/R2=0.1 A. When the switch S1 is turns on, the current value Ics flowing through the current sense terminal CS is equal to Vcs/(R1/R2)=0.11 A, wherein a current $I_{R1}$ flowing through the resistor R1 is equal to Vcs/R1=0.01 A, and a current $I_{R2}$ flowing through the resistor R2 is equal to Vcs/R2=0.1 A.

The DC-DC converter 11 is coupled to the current sense terminal CS and adjusts the current value of the operating current Io according to the current value Ics flowing through the current sense terminal CS. For example, when the switch S1 turns off, the current value Ics is equal to Vcs/R2, and the DC-DC converter 11 generates the operating current Io equal to Idc according to the current value Ics. When the switch S1 turns on, the current value Ics is equal to Vcs/(R1/R2), and the DC-DC converter 11 generates the operating current Io equal to Idc+Ig according to the current value Ics. In an embodiment, the DC-DC converter 11 may configure the operating current Io to be proportional to the current value Ics. Consequently, through configuring the frequency and duty cycle of the switch control signal CON generated by the timer circuit 122, the strobe frequency Fg and the strobe duty cycle of the operating current Io and the LED light source can be adjusted correspondingly.

Table 1 exemplifies the current $I_{R1}$ flowing through the resistor R1, the current $I_{R2}$ flowing through the resistor R2, and a ripple Iripple of the current value Ics flowing through the current sense terminal CS. The DC-DC converter 11 may adjust the provided operating current Io according to the current value Ics, and particularly, the DC-DC converter 11 adjusts the low-frequency AC current signal Ig and the DC current signal Idc of the operating current Io according to the currents $I_{R1}$ and $I_{R2}$ respectively. As shown in Table 1, as the current $I_{R2}$ changes, the current $I_{R1}$ changes with the same proportion rather than the same difference. For example, as the current $I_{R2}$ changes from 0.1 to 0.09 (i.e., decreased by 10%), the current $I_{R1}$ changes from 0.01 to 0.009, namely decreased by 10% as well. Therefore, in this embodiment, regardless of the magnitude of the current $I_{R2}$, the current value Ics flowing through the current sense terminal CS during the switch S1 being turned on (Ics=$I_{R2}$+$I_{R1}$) is always 110% of that during the switch S1 being turned off (Ics=$I_{R2}$). In other words, regardless of the magnitude of the DC current signal Idc of the operating current Io, the DC-DC converter 11 configures the operating current Io during the switch S1 being turned on to be 110% of the operating current Io during the switch S1 being turned off.

TABLE 1

| $I_{R2}$ | $I_{R1}$ | Iripple |
|---|---|---|
| 0.1 | 0.01 | 10% |
| 0.09 | 0.009 | 10% |
| 0.08 | 0.008 | 10% |
| 0.07 | 0.007 | 10% |
| 0.06 | 0.006 | 10% |
| 0.05 | 0.005 | 10% |
| 0.04 | 0.004 | 10% |
| 0.03 | 0.003 | 10% |
| 0.02 | 0.002 | 10% |
| 0.01 | 0.001 | 10% |

As mentioned above, the operating current Io provided by the DC-DC converter 11 includes the DC current signal Idc and the low-frequency AC current signal Ig caused by the strobe circuit 12. When the DC current signal Idc of the operating current Io changes (e.g., during dimming), the low-frequency AC current signal Ig of the operating current Io also change with the same proportion for avoiding the percent flicker PF to change and cause perceivable flickering lights. In particular, when the DC current signal Idc of the operating current Io increases or decreases by a certain proportion, the low-frequency AC current signal Ig of the operating current Io also increase or decrease with the same proportion correspondingly. Accordingly, regardless of the magnitude of the DC current signal Idc of the operating current Io (i.e., regardless of the brightness of the LED light source), the Gamma strobe can be realized without perceivable flickering lights.

In another embodiment, the timer circuit 122 may be configured to generate the switch control signal CON to keep the switch S1 in the on or off state continuously. In this case, the current value flowing through the current sense terminal CS remains fixed, the operating current Io provided by the DC-DC converter 11 is maintained at a constant value, and thus the Gamma strobe function is disabled.

Figure 7:
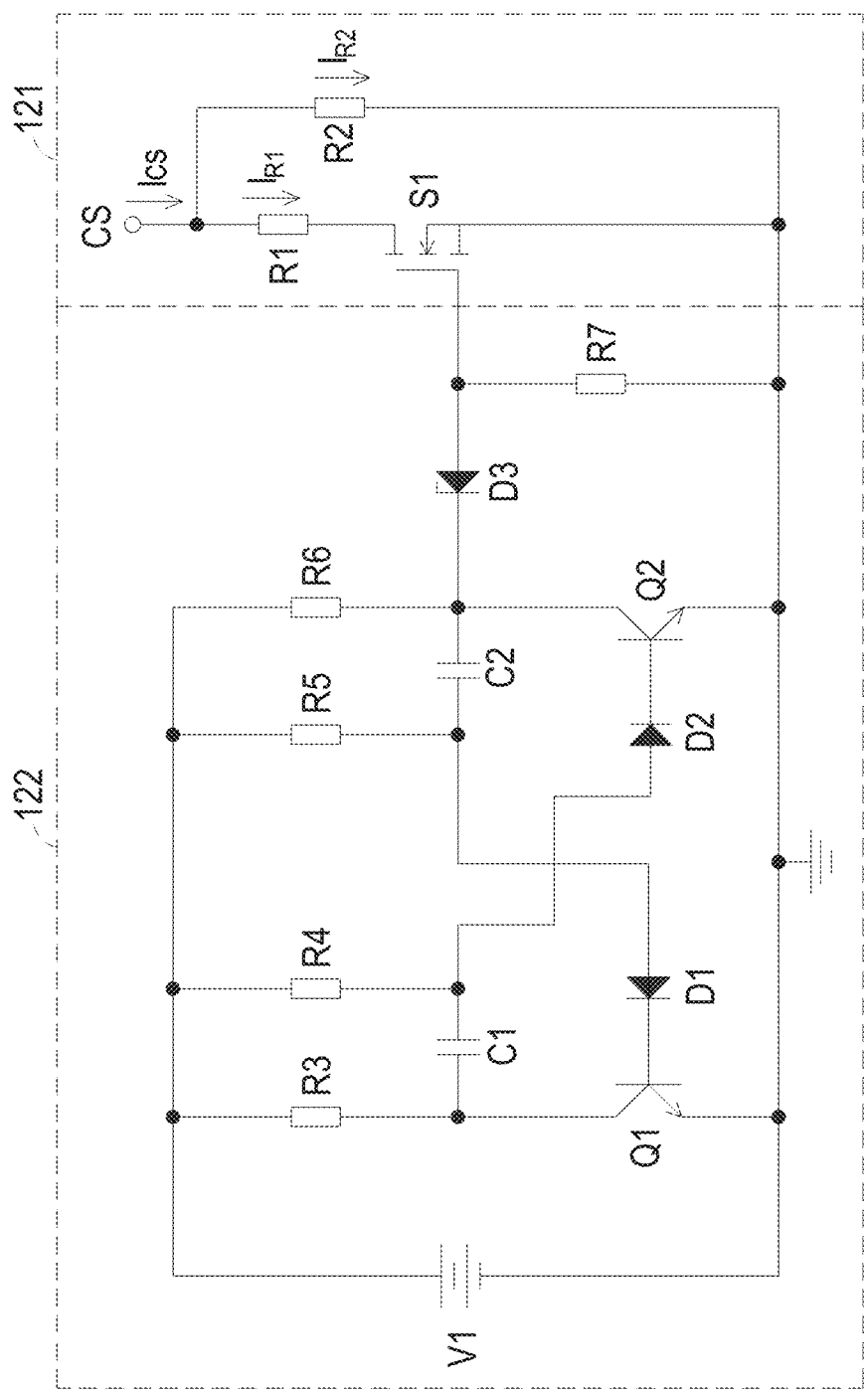
FIG. 7 schematically shows an implementation of the timer circuit of FIG. 6.

FIG. 7 schematically shows an implementation of the modulation-signal generation circuit 121 and the timer circuit 122 of FIG. 6. In this implementation, the timer circuit 122 includes an astable multivibrator adopting totem-pole topology. As shown in the FIG. 7, the timer circuit 122 includes a voltage source V1, resistors R3, R4, R5, R6 and R7, capacitors C1 and C2, diodes D1, D2 and D3, and switches Q1 and Q2. First terminals of resistors R3, R4, R5 and R6 are all coupled to a positive terminal of voltage source V1. Two terminals of capacitor C1 are coupled to second terminals of resistors R3 and R4 respectively. An anode of diode D1 is coupled to a second terminal of resistor R5. First, second and third terminals of switch Q1 are coupled to the second terminal of resistor R3, a cathode of diode D1, and a negative terminal of voltage source V1 respectively. Two terminals of capacitor C2 are coupled to second terminals of resistors R5 and R6 respectively. An anode of diode D2 is coupled to the second terminal of resistor R4. First, second and third terminals of switch Q2 are coupled to the second terminal of resistor R6, a cathode of diode D2, and the negative terminal of voltage source V1 respectively. A cathode of diode D3 is coupled to the second terminal of resistor R6, an anode of diode D3 is coupled to a first terminal of resistor R7 and the modulation-signal generation circuit 121 (switch S1), and a second terminal of resistor R7 is coupled to the negative terminal of voltage source V1. The resistors R4 and R5 serve as starting resistors for switches Q2 and Q1 respectively. In this embodiment, the switches Q1 and Q2 are bipolar junction transistors, and the first, second and third terminals thereof are collectors, bases and emitters respectively. The switch S1 is a metal-oxide-semiconductor field-effect transistor with a drain, a gate, and a source coupled to the resistor R1, the anode of diode D3, and the negative terminal of voltage source V1 respectively.

In the circuit shown in FIG. 7, as the voltage source V1 provides a voltage (e.g., 5V), one of the switches Q1 and Q2 turns on. In specific, if the voltage across capacitor C2 is charged to 0.7V, the switch Q1 turns on and meanwhile provides a reverse voltage to turn off the switch Q2, and the voltage across capacitor C1 would be charged to 5V. Conversely, if the voltage across capacitor C1 is charged to 0.7V, the switch Q2 turns on and meanwhile provides a reverse voltage to turn off the switch Q1, and the voltage across capacitor C2 would be charged to 5V. Consequently, the switches Q1 and Q2 turns on and off alternately to provide an oscillation at the frequency within the Gamma band (e.g., 40 Hz). In addition, when the switch Q2 turns on, the gate voltage of switch S1 discharges to turn off the switch S1; and when the switch Q2 turns off, the voltage across resistors R6 and R7 builds the gate voltage to turn on the switch S1. When the switch S1 turns on, the resistance value Rcs between the current sense terminal CS and the ground potential is equal to the resistance value of parallel resistors R1 and R2, and the current value Ics flowing through the current sense terminal CS is equal to Vcs/Rcs=Vcs/(R1/R2). Alternatively, when the switch S1 turns off, the resistance value Rcs between the current sense terminal CS and the ground potential is equal to the resistance value of the resistor R2, and the current value Ics flowing through the current sense terminal CS is equal to Vcs/Rcs=Vcs/R2. For example, Vcs is 0.1 V, R1 is 1052, and R2 is 122. When the switch S1 turns off, the current value Ics flowing through the current sense terminal CS is equal to Vcs/R2=0.1 A. When the switch S1 turns on, the current value Ics flowing through the current sense terminal CS is equal to Vcs/(R1/R2)=0.11 A, wherein the current $I_{R1}$ flowing through the resistor R1 is equal to Vcs/R1=0.01 A, and the current $I_{R2}$ flowing through the resistor R2 is equal to Vcs/R2=0.1 A.

The DC-DC converter 11 is coupled to the current sense terminal CS and adjusts the current value of the operating current Io according to the current value Ics flowing through the current sense terminal CS. For example, when the switch S1 turns off, the current value Ics is equal to Vcs/R2, and the DC-DC converter 11 generates the operating current Io equal to Idc according to the current value Ics. When the switch S1 turns on, the current value Ics is equal to Vcs/(R1/R2), and the DC-DC converter 11 generates the operating current Io equal to Idc+Ig according to the current value Ics. In an embodiment, the DC-DC converter 11 may configure the operating current Io to be proportional to the current value Ics. Consequently, through configuring the frequency and duty cycle of the switching of switch S1, driven by the timer circuit 122, the strobe frequency Fg and the strobe duty cycle of the operating current Io and the LED light source can be adjusted correspondingly.

The possible implementations of the DC-DC converter 11 and the strobe circuit 12 of the present disclosure are not limited to the above. As long as the DC-DC converter 11 has the function of DC-DC conversion and the strobe circuit 12 is able to let the operating current provided by the DC-DC converter 11 include low-frequency pulse signals, suitable implementations of the DC-DC converter 11 and the strobe circuit 12 may be selected according to actual requirements.

Figure 8:
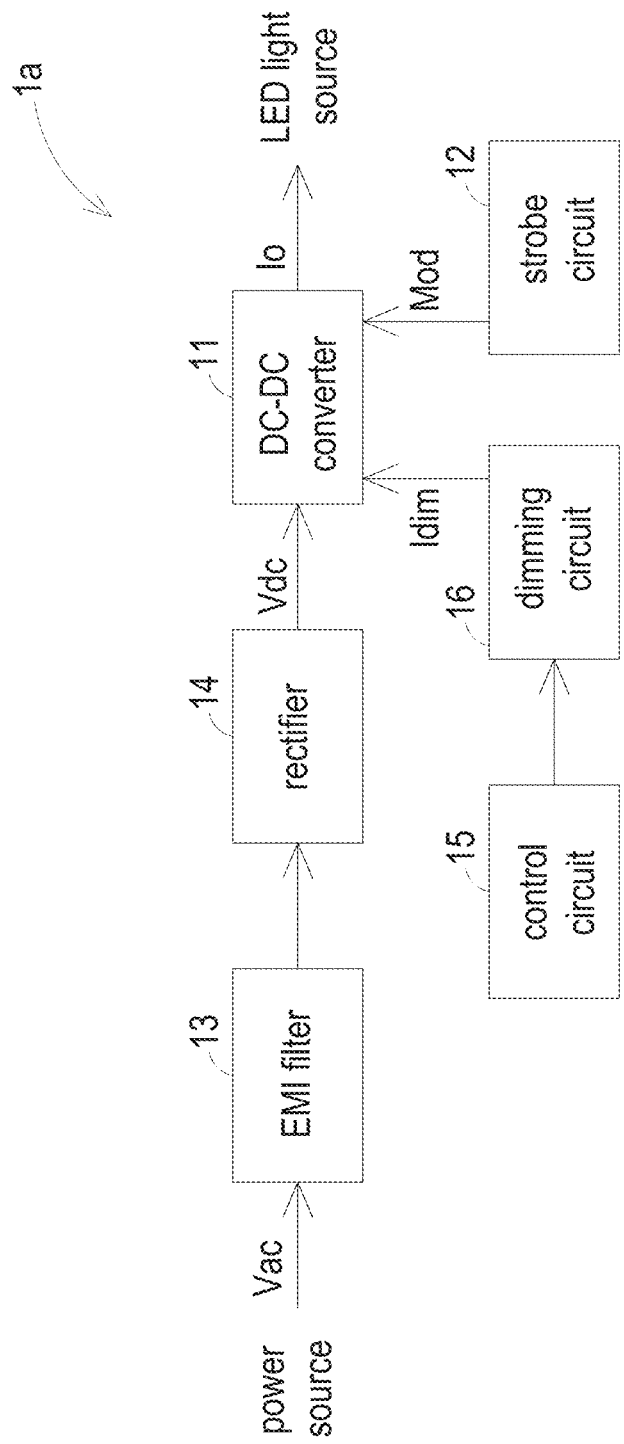
FIG. 8 is a schematic block diagram illustrating an LED driver according to a second embodiment of the present disclosure.

FIG. 8 is a schematic block diagram illustrating an LED driver according to a second embodiment of the present disclosure. In FIG. 8, the components corresponding to the counterparts of the first embodiment shown in FIG. 3 are designated by the same numeral references, and thus the detailed descriptions thereof are omitted herein. Compared to the LED driver 1 of the first embodiment shown in FIG. 3, the LED driver 1a of the second embodiment shown in FIG. 8 further includes a control circuit 15 and a dimming circuit 16. The control circuit 15 receives a dimming control signal and accordingly configures the dimming circuit 16 to provide a dimming signal Idim to the DC-DC converter 11. The control circuit 15 may be implemented by a microcontroller or other suitable circuits. The dimming circuit 16 is coupled to the DC-DC converter 11. According to the dimming signal Idim, the DC-DC converter 11 adjusts the operating current Io, provided to the LED light source, to adjust the brightness of the LED light source. In an embodiment, the strobe circuit 12 may include a microcontroller and utilize the microcontroller to provide PWM (pulse width modulation) dimming signals. In an embodiment, the strobe circuit 12 may be integrated with the control circuit 15 or the dimming circuit 16, and utilizes the microcontroller to provide the DC-DC converter 11 with the combination of the dimming signal and the low-frequency modulation signal. For example, the microcontroller of the strobe circuit 12 generates the PWM dimming signals at 1.25 kHz. In one period (e.g., 0.025 seconds, corresponding to the frequency of 40 Hz), 90% of the PWM dimming signals have a PWM signal duty cycle of 80%, and the remaining 10% of the PWM dimming signals have the PWM signal duty cycle of 88%. The DC-DC converter 11 adjusts the maximum value and the minimum value of the operating current Io according to the PWM signal duty cycles of the said 90% of the PWM dimming signals and the said 10% of the PWM dimming signals, respectively. Under this circumstance, the strobe duty cycle of the LED light source is 10%, and the percent flicker PF=(88−80)/(88+80)*100%≈4.7%. Thereby, the LED light source produces the Gamma strobe with the percent flicker PF less than 5%.

Figure 9:
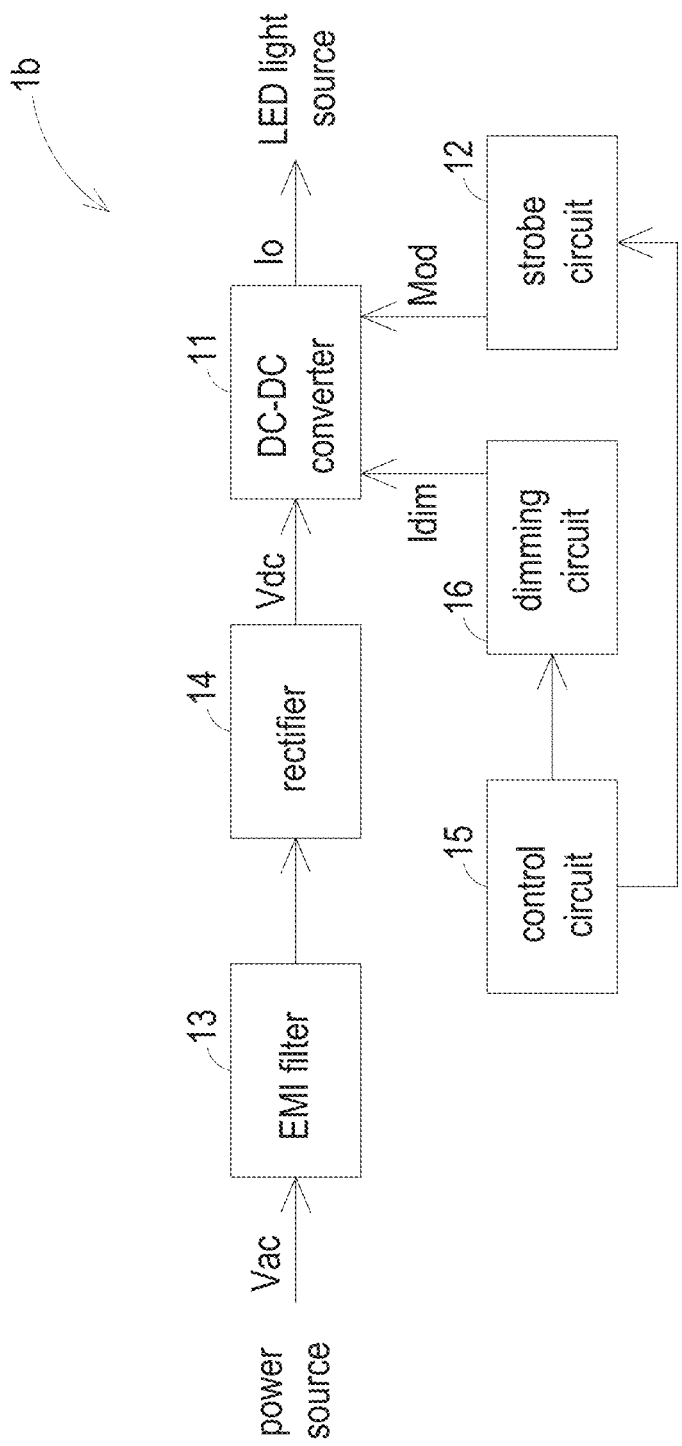
FIG. 9 schematically shows a variant of the LED driver of FIG. 8.

In the above embodiments, the strobe circuit 12 generates the signal with the frequency within the Gamma band continuously, but the present disclosure is not limited thereto. In some other embodiments, the strobe circuit 12 may be controlled to enable or disable the function of generating the signal with the frequency within the Gamma band. FIG. 9 schematically shows a variant of the LED driver of FIG. 8. As shown in FIG. 9, in this LED driver 1b, the control circuit 15 is further coupled to the strobe circuit 12 for controlling the operation of the strobe circuit 12. According to the received control signal (e.g., from the user or other circuits), the control circuit 15 configures the strobe circuit 12 to generate or stop generating the signal with the frequency within the Gamma band (e.g., for configuring the switch S1 of FIG. 6 or FIG. 7 to keep in the on or off state by the switch control signal CON).

Figure 10:
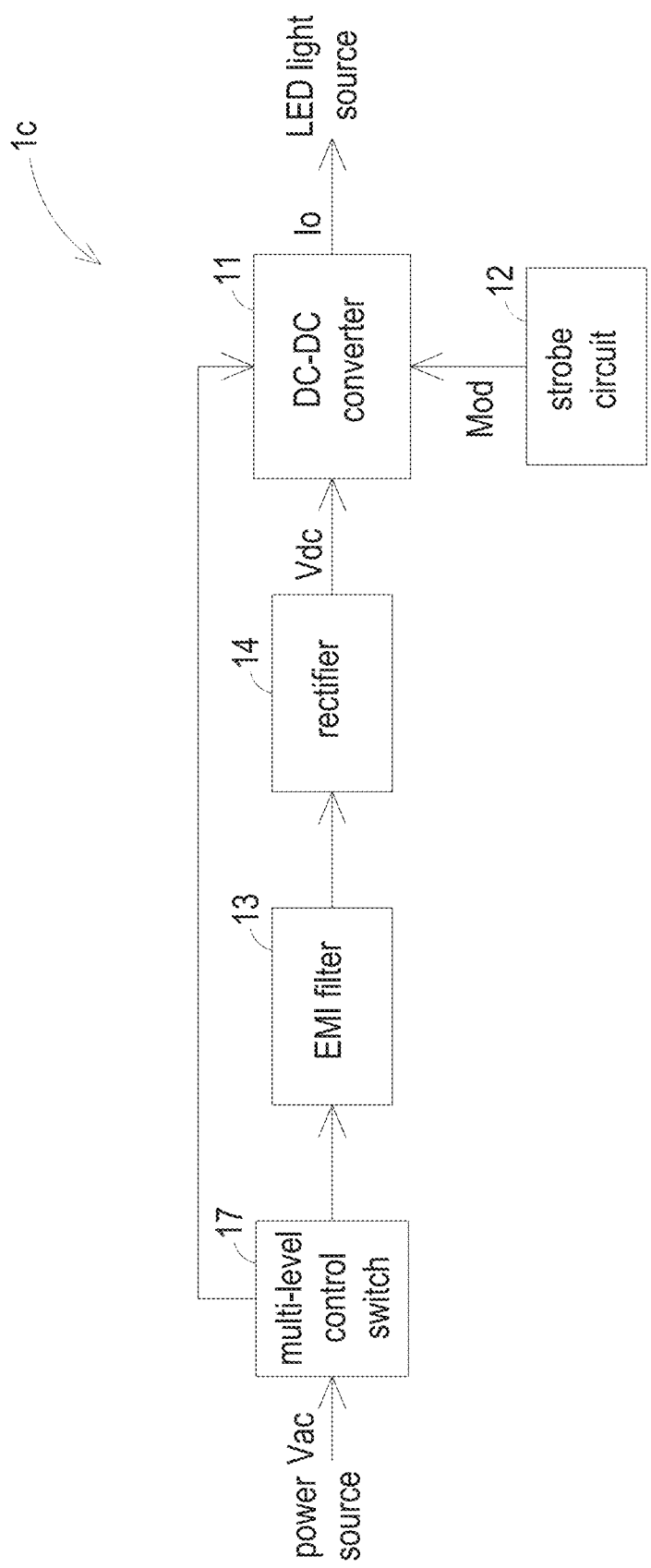
FIG. 10 is a schematic block diagram illustrating an LED driver according to a third embodiment of the present disclosure.

FIG. 10 is a schematic block diagram illustrating an LED driver according to a third embodiment of the present disclosure. In FIG. 10, the components corresponding to the counterparts of the first embodiment shown in FIG. 3 are designated by the same numeral references, and thus the detailed descriptions thereof are omitted herein. Compared to the LED driver 1 of the first embodiment shown in FIG. 3, the LED driver 1c of the third embodiment shown in FIG. 10 further includes a multi-level control switch 17 coupled to the power source, the DC-DC converter 11 and the EMI filter 13 for providing the dimming function. The multi-level control switch 17 receives the power source and selectively switches to provide several different power levels. As the multi-level control switch 17 provides one of the power levels, the DC-DC converter of the LED driver Ic adjusts the DC current signal Idc accordingly, and the strobe circuit 12 configures the corresponding low-frequency AC current signal Ig, thereby realizing the function of dimming and Gamma strobe. The switching of the multi-level control switch 17 may be implemented by a mechanical switch, but not limited thereto. In an embodiment, the LED driver 1c selectively operates in three different modes based on the switching of the multi-level control switch 17. In the first mode, the LED driver 1c provides 100% of output to the LED light source, and a main light of the LED light source works with a full brightness. In the second mode, the LED driver provides 65% of output to the LED light source, and the main light of the LED light source works with a reduced brightness. In the third mode, the LED light source is turned off.

According to the above embodiments, the LED driver of the present disclosure may configure the LED light source to be brighter in X % of the time of a period than the other (100−X) % of the time of the period. In an embodiment, X % may be configured to be less than 50%. In another embodiment, X % may be configured to be less than 30%. In another embodiment, X % may be configured to be a suitable value in the range of 10%-30%. The low-frequency AC current signal of the operating current is between 30 Hz and 50 Hz (e.g., 40 Hz), and correspondingly, the LED driver configures the LED light source to be brighter in X % of the time of the period with the frequency of the low-frequency AC current signal.

In addition, the operating current generated by the LED driver during the LED light source being brighter (i.e., in the X % of the time of the period) is less than Y % of the operating current generated by the LED driver during the LED light source being darker (i.e., in the other (100−X) % of the time of the period) so that the LED light source may perform the Gamma strobe without perceivable flickering lights. In an embodiment, Y % may be configured to be less than 120% (e.g., 110%) so that the percent flicker PF is less than 5%.

Moreover, the amplitude of the low-frequency AC current signal of the operating current during the LED light source being brighter (i.e., in the X % of the time of the period) is proportional to the amplitude of the DC current signal of the operating current during the LED light source being darker (i.e., in the other (100−X) % of the time of the period). Therefore, regardless of the brightness of the LED light source, the percent flicker PF is maintained at a certain value to avoid perceivable flickering lights.

Furthermore, while using PWM signals for dimming, the PWM signal duty cycle Z1 during the LED light source being brighter (i.e., in the X % of the time of the period) is less than W % of the PWM signal duty cycle Z2 during the LED light source being darker (i.e., in the other (100−X) % of the time of the period) so that the LED light source may perform the Gamma strobe without perceivable flickering lights. In an embodiment, W % may be configured to be less than 120% (e.g., 110%) so that the percent flicker PF (=(Z1−Z2)/(Z1+Z2)*100%) is less than 5%.

Figure 11:
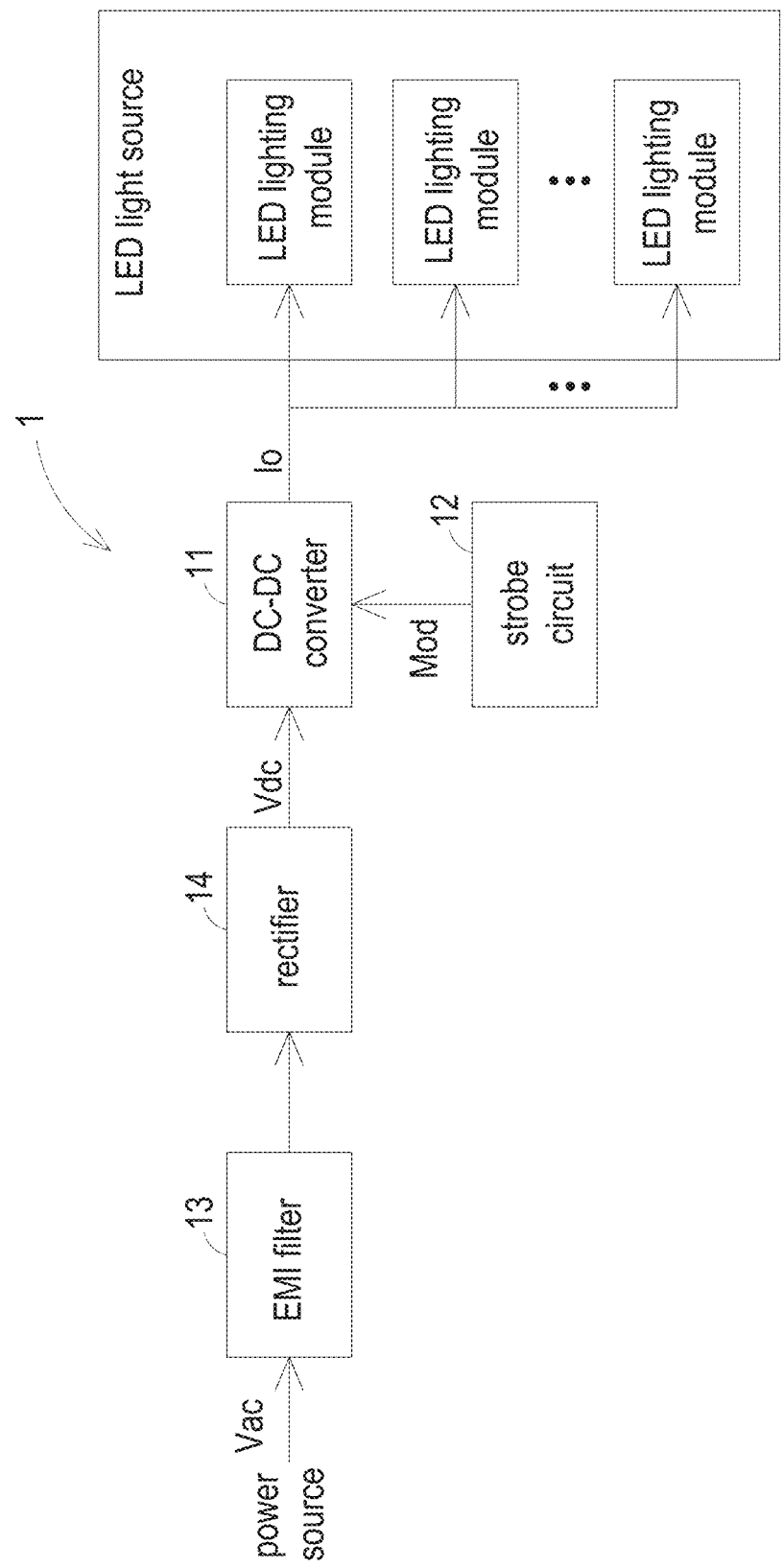
FIG. 11 is a schematic block diagram illustrating an LED lighting system according to an embodiment of the present disclosure.
Figure 12:
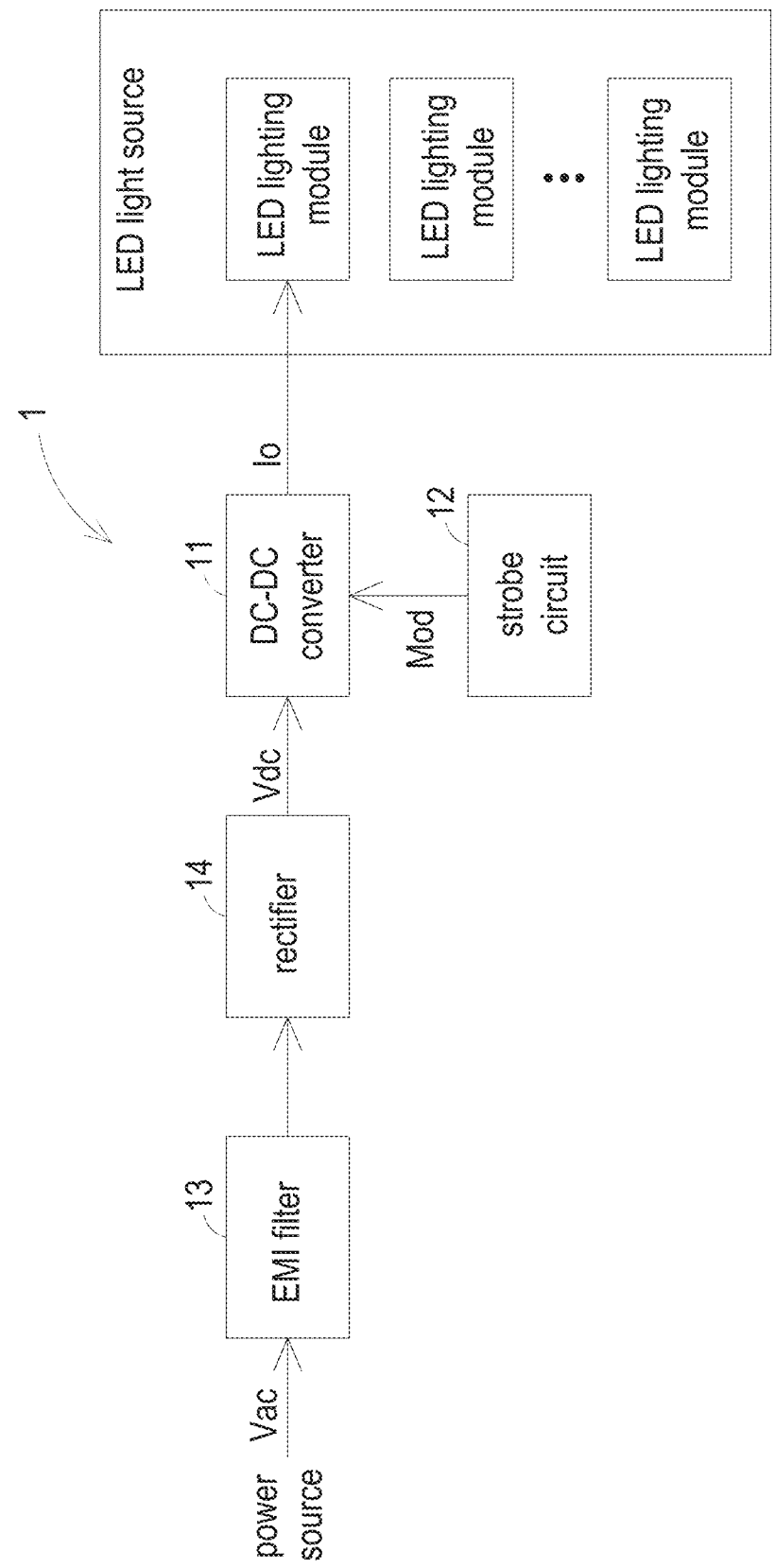
FIG. 12 schematically shows a variant of the LED lighting system of FIG. 11.

In an embodiment, as exemplified in FIG. 11, an LED lighting system includes the LED driver 1 and the LED light source, and the LED light source includes a plurality of LED lighting modules. The DC-DC converter 11 is coupled to all the LED lighting modules of the LED light source for driving all the LED lighting modules of the LED light source to provide illumination and Gamma strobe functions simultaneously. In another embodiment, as exemplified in FIG. 12, an LED lighting system includes the LED driver 1 and the LED light source, and the LED light source includes a plurality of LED lighting modules. The DC-DC converter 11 is coupled to a part of the LED lighting modules. Accordingly, all the LED lighting modules of the LED light source can provide illumination function, and the part of the LED lighting modules driven by the DC-DC converter 11 can provide illumination and Gamma strobe functions simultaneously. Therefore, there is no need to configure an LED lighting module for specially providing Gamma strobe function and design the disposing position, and the illumination effect is more uniform. Further, since the LED lighting modules may provide the illumination and Gamma strobe functions simultaneously, it requires fewer LED lighting modules to achieve the same brightness, thereby achieving environmental protection and energy-saving benefits. Additionally, the LED driver 1 of FIG. 3 is shown in FIG. 11 and FIG. 12 as an example, but the present disclosure is not limited thereto. This kind of implementation may be applied to any LED driver of the present disclosure (e.g., the LED drivers 1a, 1b and 1c shown in FIGS. 8, 9 and 10).

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An LED (light-emitting diode) driver for driving an LED light source, comprising:
    a strobe circuit, configured to generate a low-frequency modulation signal; and
    a DC-DC converter, coupled to the strobe circuit and configured to provide an adjustable operating current to the LED light source according to a DC signal and the low-frequency modulation signal, wherein the operating current comprises a DC current signal and a low-frequency AC current signal corresponding to the DC signal and the low-frequency modulation signal respectively,
    wherein a frequency of the low-frequency AC current signal is between 25 Hz and 100 Hz, and a current ripple factor, equaling a difference of a maximum value and a minimum value of the operating current divided by a sum of the maximum value and the minimum value, is less than 8%.

2. The LED driver according to claim 1, wherein the strobe circuit comprises:
    a modulation-signal generation circuit, comprising a current sense terminal, a switch, a first resistor and a second resistor, wherein the first resistor and the switch are coupled in series between the current sense terminal and a ground potential, and the second resistor is coupled between the current sense terminal and the ground potential and is coupled in parallel to the first resistor and the switch; and
    a timer circuit, coupled to the modulation-signal generation circuit and providing a switch control signal to the switch to configure a conduction state of the switch so that the modulation-signal generation circuit correspondingly generates the low-frequency modulation signal,
    wherein the DC-DC converter is coupled to the current sense terminal for adjusting the operating current according to a current value flowing through the current sense terminal.

3. The LED driver according to claim 1, further comprising a control circuit and a dimming circuit, wherein the control circuit receives a dimming control signal and correspondingly configures the dimming circuit to provide a dimming signal to the DC-DC converter, and the DC-DC converter adjusts the operating current according to the dimming signal.

4. The LED driver according to claim 3, wherein the control circuit is further coupled to the strobe circuit for configuring the strobe circuit to generate or stop generating the low-frequency modulation signal.

5. The LED driver according to claim 1, further comprising a multi-level control switch coupled to the DC-DC converter, wherein the multi-level control switch is selectively configured to provide one of a plurality of power levels so that the DC-DC converter adjusts the DC current signal of the operating current correspondingly.

6. The LED driver according to claim 1, wherein the strobe circuit comprises a microcontroller for providing a PWM (pulse width modulation) dimming signal to the DC-DC converter, the PWM dimming signal is formed by a first portion and a second portion in one period, a first duty cycle of the first portion of the PWM dimming signal is less than 120% of a second duty cycle of the second portion of the PWM dimming signal, and the DC-DC converter adjusts the maximum value and the minimum value of the operating current according to the first duty cycle and the second duty cycle respectively.

7. The LED driver according to claim 6, wherein the first duty cycle of the first portion of the PWM dimming signal is less than 110% of the second duty cycle of the second portion of the PWM dimming signal.

8. The LED driver according to claim 1, wherein a ratio of the maximum value of the operating current to the minimum value of the operating current is fixed and is less than 120%.

9. The LED driver according to claim 8, wherein the ratio is less than 110%.

10. The LED driver according to claim 1, wherein the frequency of the low-frequency AC current signal is between 30 Hz and 50 Hz.

11. The LED driver according to claim 10, wherein the frequency of the low-frequency AC current signal is 40 Hz.

12. The LED driver according to claim 1, wherein a percentage of time that the operating current is at the maximum value within one period is less than 50%.

13. The LED driver according to claim 12, wherein the percentage of time is less than 30%.

14. The LED driver according to claim 13, wherein the percentage of time is greater than 10%.

15. The LED driver according to claim 1, wherein the current ripple factor is less than 5%.

16. The LED driver according to claim 1, wherein the current ripple factor is less than 1%.

17. An LED lighting system, comprising:
an LED light source; and
an LED driver, driving the LED light source, and comprising:
  a strobe circuit, configured to generate a low-frequency modulation signal; and
  a DC-DC converter, coupled to the strobe circuit and the LED light source, and configured to provide an adjustable operating current to the LED light source according to a DC signal and the low-frequency modulation signal, wherein the operating current comprises a DC current signal and a low-frequency AC current signal corresponding to the DC signal and the low-frequency modulation signal respectively,
wherein a frequency of the low-frequency AC current signal is between 25 Hz and 100 Hz, and a current ripple factor, equaling a difference of a maximum value and a minimum value of the operating current divided by a sum of the maximum value and the minimum value, is less than 8%.

18. The LED lighting system according to claim 17, wherein the LED light source comprises a plurality of LED lighting modules, and the DC-DC converter is coupled to the plurality of LED lighting modules for providing the operating current to the plurality of LED lighting modules.

19. The LED lighting system according to claim 17, wherein the LED light source comprises a plurality of LED lighting modules, and the DC-DC converter is coupled to a part of the plurality of LED lighting modules for providing the operating current to a part of the plurality of LED lighting modules.

20. An operating method of an LED (light-emitting diode) driver for driving an LED light source, comprising:
generating a low-frequency modulation signal with a strobe circuit of the LED driver; and
providing an adjustable operating current to the LED light source according to a DC signal and the low-frequency modulation signal with a DC-DC converter of the LED driver coupled to the strobe circuit;
wherein the operating current comprises a DC current signal and a low-frequency AC current signal corresponding to the DC signal and the low-frequency modulation signal respectively; a frequency of the low-frequency AC current signal is between 25 Hz and 100 Hz; and a current ripple factor, equaling a difference of a maximum value and a minimum value of the operating current divided by a sum of the maximum value and the minimum value, is less than 8%.

* * * * *